(12) United States Patent
Futami

(10) Patent No.: US 7,692,818 B2
(45) Date of Patent: Apr. 6, 2010

(54) IMAGE READING APPARATUS

(75) Inventor: Hiroyuki Futami, Tokyo (JP)

(73) Assignee: Konica Minolta Business Technologies, Inc. (JP)

( * ) Notice: Subject to any disclaimer, the term of this patent is extended or adjusted under 35 U.S.C. 154(b) by 0 days.

(21) Appl. No.: 11/873,967

(22) Filed: Oct. 17, 2007

(65) Prior Publication Data
US 2008/0137107 A1 Jun. 12, 2008

(30) Foreign Application Priority Data
Dec. 7, 2006 (JP) ............... 2006-330287

(51) Int. Cl.
*H04N 1/04* (2006.01)
(52) U.S. Cl. ............. 358/3.26; 358/461; 358/465; 358/463; 358/496; 358/406; 358/474
(58) Field of Classification Search ............ 358/461, 358/496, 498, 406, 474, 483, 504, 408, 505, 358/463, 465; 382/274; 399/367, 374
See application file for complete search history.

(56) References Cited

U.S. PATENT DOCUMENTS

| | | | | |
|---|---|---|---|---|
| 7,411,704 | B2 * | 8/2008 | Wang | 358/461 |
| 7,433,097 | B2 * | 10/2008 | Spears | 358/504 |
| 2004/0179242 | A1 * | 9/2004 | Nakaya | 358/461 |
| 2007/0109605 | A1 * | 5/2007 | Shimizu | 358/3.26 |
| 2007/0223062 | A1 * | 9/2007 | Tanaka et al. | 358/497 |

FOREIGN PATENT DOCUMENTS

| | | | |
|---|---|---|---|
| JP | 2001086333 | | 3/2001 |
| JP | 2002-262035 | A | 9/2002 |
| JP | 2005006249 | A * | 1/2005 |
| JP | 2005-176044 | A | 6/2005 |

OTHER PUBLICATIONS

Japanese Office Action for Japanese Patent Application No. 2006-330287 mailed Aug.18, 2009.
Japanese Office Action for Japanese Patent Application No. 2006-330287 mailed Dec. 2, 2008 with English Translation

* cited by examiner

*Primary Examiner*—Cheukfan Lee
(74) *Attorney, Agent, or Firm*—Cantor Colburn LLP

(57) ABSTRACT

An image reading apparatus for reading an image on an original document by irradiating it with light and photoelectrically converting reflected light from it by an image pickup unit, including: an original document guide member positionable opposite to the image pickup unit, with a conveyance position of the original document therebetween; a white reference member that is positionable, the same as the original document guide member, and has a reference white color; an achromatic constant-density reference member that is positionable, the same as the original document guide member, and has a reference achromatic constant-density; a drive unit that moves one of the three members so as to be positioned opposite to the image pickup unit; and a control unit that controls execution of detection processings for dust detection from data obtained by moving, as described above, the achromatic constant-density reference member and the white reference member by reading them.

12 Claims, 8 Drawing Sheets

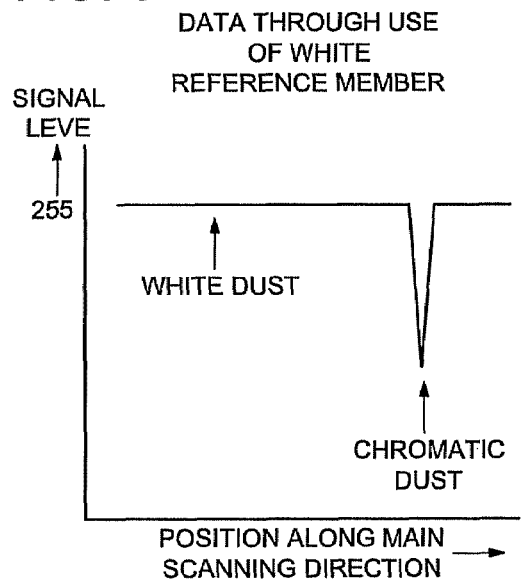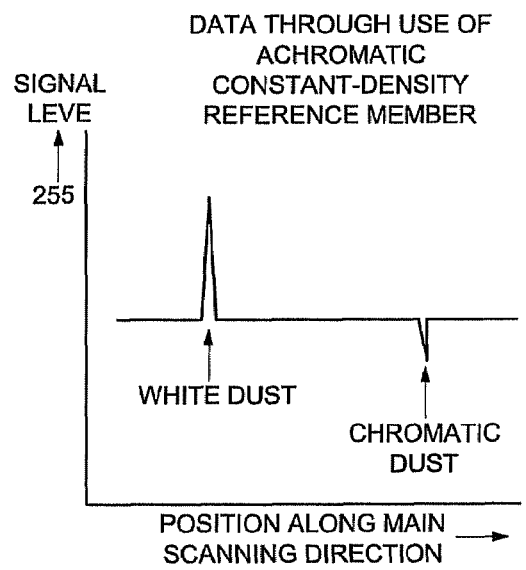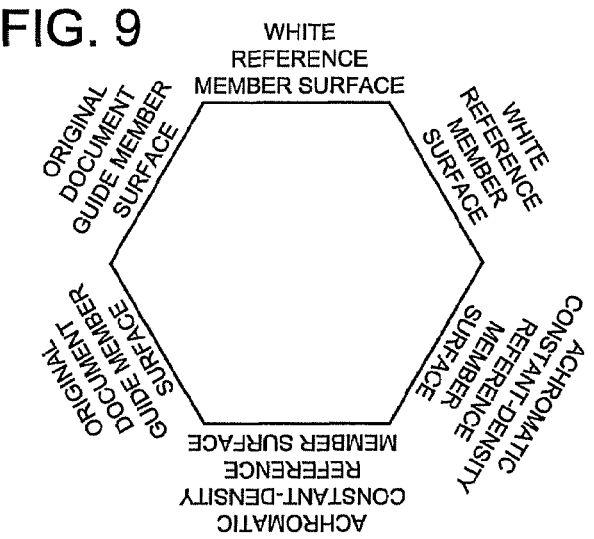

IMAGE READING APPARATUS

This application is based on Japanese Patent Application No. 2006-330287 filed on Dec. 7, 2006, in Japanese Patent Office, the entire content of which is hereby incorporated by reference.

FIELD OF THE INVENTION

The present invention relates to dust detection in an image reading apparatus that irradiates an original document with light, photoelectrically converts reflected light from the original document by an image pickup unit of a contact type and thereby reads the image of the original document.

BACKGROUND OF THE INVENTION

A conventional image reading apparatus, in a prior art, which uses a contact type image-pickup unit called a CIS or the like, calibrates sensitivity variation (irregularity) of respective pixels of the image-pickup unit or irradiation intensity variation by an original document irradiation system, in other words, carries out shading calibration, based on image data obtained by reading a white reference member having a white colored surface serving as a reference.

In this situation, dust contamination of a white reference member on which shading data for shading calibration is based on provides incorrect shading data, which is unfavorable.

Accordingly, in order to prevent storing incorrect data, when there are pixel portions, which are lower than a predetermined level, in image data obtained as a result of reading of a white reference member, it is determined that colored dust is mixed in the portions, and shading calibration data is generated while performing a process to remove effects by the color dust. Herein, color dust generically means chromatic dust, and achromatic (gray to black) dust other than white color.

On the other hand, white dust, such as paper dust, cannot be distinguished from the white color of a white reference member, and may cause generation of incorrect shading calibration data.

In this situation, it is attempted to detect white dust when generating shading calibration data, such as disclosed in Patent Document 1.

Patent Document 1: Japanese Patent Application Publication TOKKAI No. 2001-86333 (page 1, FIG. 1)

In the invention disclosed by above Patent Document 1, the light intensity of a light source of an image reading device is switched so as to detect color dust with an ordinary light intensity, and detect white dust in a state where the illuminance on a white reference member is lowered by reducing the light intensity by half.

However, even when light intensity can be controlled, there is a problem that the control is not easy, or the light intensity cannot be controlled depending on the type of a lamp. Particularly, with xenon lamps which are used recently because of low heat generation, controlling of the light intensity is difficult, which does not allow application of control disclosed in Patent Document 1.

The present invention was devised to solve problems, as described above, and relates to dust detection which allows easy detection of white dust as well as color dust in an image reading apparatus that irradiates an original document with light and reads an image of the original document by photoelectrically converting reflected light from the original document with a contact type image pick-up unit.

SUMMARY OF THE INVENTION

In an aspect of the invention, there is provided an image reading apparatus for reading an image on an original document by irradiating the original document with light and photoelectrically converting reflected light from the original document by a contact type image pickup unit, including:

an original document guide member that is positionable at a position opposite to the image pickup unit, with a conveyance position of the original document therebetween, and is used when the original document is conveyed;

a white reference member that is positionable at the position opposite to the image pickup unit, with the conveyance position of the original document therebetween, the white reference member having a reference white color on a surface;

an achromatic constant-density reference member that is positionable at the position opposite to the image pickup unit, with the conveyance position of the original document therebetween, the achromatic constant-density reference member having a reference achromatic constant-density on a surface;

a drive unit that moves one of the original document guide member, the white reference member, and the achromatic constant-density reference member so as to be positioned at the position opposite to the image pickup unit; and a control unit that controls execution of a first detection processing for dust detection from data obtained by moving the achromatic constant-density reference member to the position opposite to the image pickup unit by the drive unit and by reading the achromatic constant-density reference member, and execution of a second detection processing for dust detection from data obtained by moving the white reference member to the position opposite to the image pickup unit by the drive unit and by reading the white reference member.

BRIEF DESCRIPTION OF THE DRAWINGS

FIGS. 8a and 8b are characteristic diagrams showing characteristics of data obtained in the above embodiment of the invention; and FIG. 9 is an illustrative diagram showing an example of an opposing plate 500 in another embodiment of the invention.

PREFERRED EMBODIMENTS OF THE INVENTION

Figure 1:
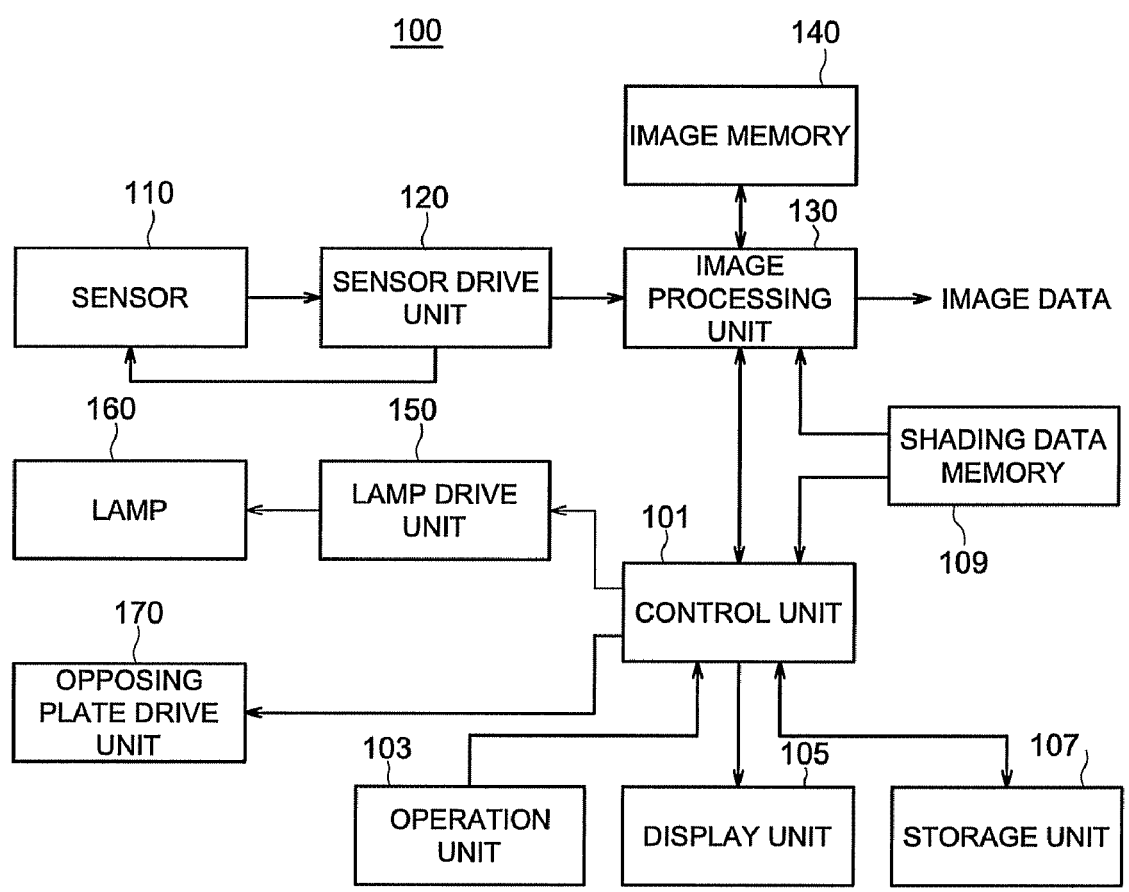
FIG. 1 is a function block diagram showing an electrical structure of an image reading apparatus in an embodiment of the present invention.

The best modes for practicing the invention (hereinafter, referred to embodiments) will be described in detail, referring to the drawings.

Incidentally, embodiments of the invention can be applied to an image reading apparatus that reads the content of an original document as image information to generate and output image data, an image forming apparatus (copier) that is provided with a function to read the content of a copying object (original document) as image information with an original document reading unit (scanner) and then copy it, and further an image transmitting apparatus (facsimile apparatus) that is provided with a function to read the content of a transmitting object (original document) as image information with an original document reading unit (scanner) and then transmit the data via a communication line.

(Mechanical Structure of an Image Reading Apparatus)

First, the mechanical structure of an image reading apparatus in accordance with the present embodiment will be described, referring to FIG. 2. Herein, an image reading apparatus 100 will be taken as an example of the present embodiment, the image reading apparatus 100 being provided with a function to read the both sides of an original document in parallel through conveyance of a single time, while automatically conveying the original document.

Herein, while an ADF 200 conveys an original document loaded on an original document tray 210 in the arrow direction shown in the figure, the ADF 200 reads the image on a surface of original document by a CCD 310 of a scanner main body 300 at position (1), then reads the image on the back side of the original document by a CIS (Contact Image Sensor) module 400 being a contact type image pick-up unit at position (2), and ejects the original document onto an original document ejection tray 220. That is, by reading the both sides of the original document in parallel during a single pass, damage on the original document can be decreased and the productivity can be improved.

In the present embodiment, the CIS module 400 reads an image on an original document by irradiating an original document with light and photoelectrically converting the reflected light from the original document by an image pickup unit of a contact type. Further, an opposing plate 500 is disposed which includes an original document guide member which is positionable at an opposite position to the CIS module 400 with the conveying position of an original document therebetween and is used during conveyance of an original document, a white reference member that is positionable at an opposite position to the image pickup unit with the conveying position of the original document therebetween and has a white color to be a reference on the surface, and an achromatic constant-density reference member that is positionable at an opposite position to the image pickup unit and has an achromatic constant-density to be a reference on the surface.

Herein, the CIS module 400 and opposing plate 500 will be described, referring to FIG. 3. The CIS module 400 is provided with a glass 401 disposed on the light input and output side, lamps 402 and 403 to irradiate an original document, further, a lens 405 to guide reflected light from the original document, and a sensor 410 as a line sensor that photoelectrically converts the light from the lens 405. The CIS module 400 and the respective elements thereof are arranged such that the main scanning direction is along the direction perpendicular to the sheet of FIGS. 2 and 3.

Figure 2:
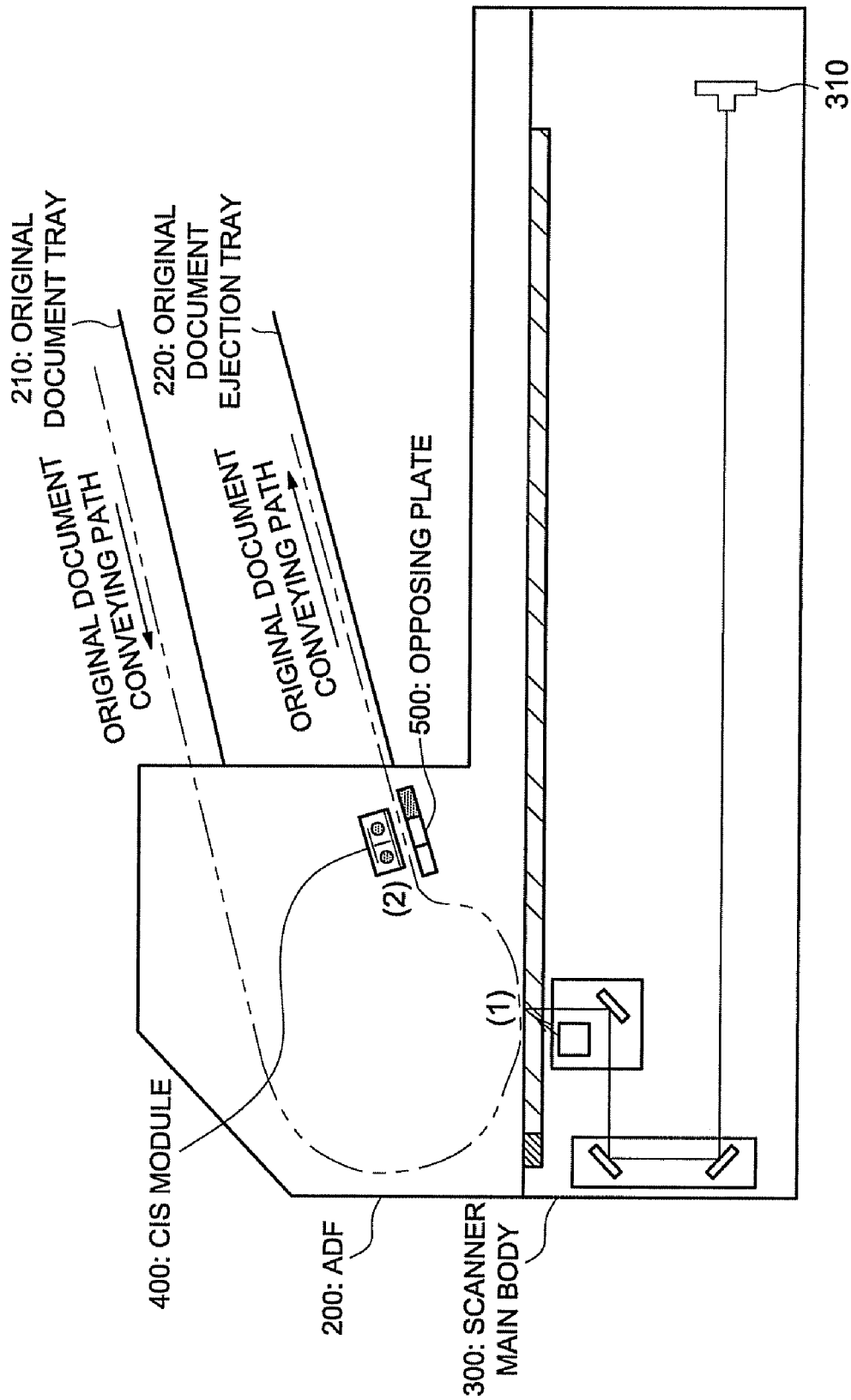
FIG. 2 is a structure diagram showing a mechanical structure of the image reading apparatus in the above embodiment of the invention.
Figure 3:
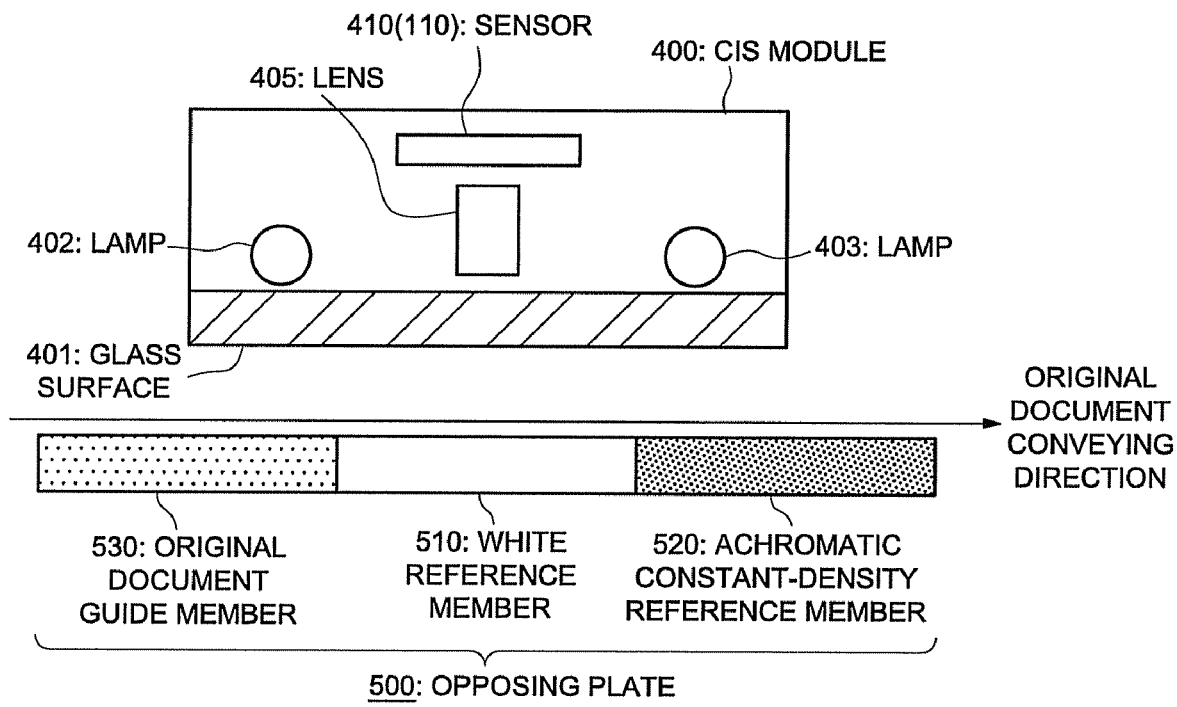
FIG. 3 is another structure diagram showing a mechanical structure of the image reading apparatus in the above embodiment of the invention.

Herein, the lamps 402 and 403, which are arranged with the longitudinal direction thereof along the direction perpendicular to the sheet planes of FIGS. 2 and 3 (main scanning direction), irradiate a conveyed original document or the opposing plate 500. Reflected light from the original document or the opposing plate 500 is collected by the lens 405 to form an image on the light-receiving surface of the sensor 410 being the image pickup unit (photoelectrical conversion init).

The opposing plate 500 is provided with the white reference member 510 made of Yupo Paperor or the like having a uniform white density for detection of chromatic dust and shading calibration, an achromatic constant-density reference member 520 which is achromatic having a constant density for detection of white dust, and an original document guide member 530 to be used as a guide plate during conveyance of an original document.

(Electrical Structure of the Image Reading Apparatus)

FIG. 1 is a block diagram showing the detailed structure in the image reading apparatus in the first embodiment of the present invention. In the description In FIG. 1, emphasis is made on the parts necessary for description of the operation featuring the present embodiment, and description of other known parts of the image reading apparatus is omitted. That is, description is made on the CIS module 400 and the peripherals, wherein the description of a known scanner main body 300 is omitted.

A control unit 101 controls respective units of the image reading apparatus 100. The control unit 100 performs control to drive the white reference member 510 to the opposite position to the CIS module 400 by a drive unit, described later, and carry out a dust detection processing, performs control to drive the achromatic constant-density reference member 520 to the opposite position to the CIS module 400 by the drive unit and carry out dust detection processing, and performs control to detect the positions of dust from the processing result by an image processing unit, described later, through the dust detection processings. Further, the control unit 101 performs control for shading calibration after the dust detection processings.

That is, the control unit 101 performs control to execute a first dust detection processing that moves the achromatic constant-density reference member 520 to the opposite position to the CIS module 400 and detects dust from data obtained by reading the achromatic constant-density reference member 520, and a second dust detection processing that moves the white reference member 510 to the opposite position to the CIS module 400 by the drive unit and detects dust from data obtained by reading the white reference member 510.

Further, the control unit 101 performs control to cause the lamps 402 and 403 to emit light at the time of dust detection processings, obtaining shading calibration data, and reading original documents.

Various inputs, such as an original document size and a start of reading, are made via an operation unit 103. A display unit 105 of the image reading apparatus displays various statuses and messages with characters, numerical codes, pictograms and the like, based on the control by the control unit 101. Or, the display unit 105 makes a display or alarm by the use of blinking of light or sounds, as necessary. The operation unit 103 and display unit 105 may be integrally constructed as a touch panel type.

A storage unit 107 stores setting data, such as shading initialization data. Further, a shading data memory 109 stores shading data, black calibration data and shading calibration data.

Herein, shading data is obtained by reading the white reference member 510 with the lamps burned, and the black calibration data is obtained by reading the white reference member 510 with the lamps turned off. Shading calibration data is generated from the shading data and the black calibration data.

A line sensor 110 serves as an image pickup unit that reads images of an original document or the opposing plate 500 irradiated by the lamp 160 (lamps 402 and 403 in FIG. 3) along the main scanning direction (the direction perpendicular to the sheet plane of the figure). Herein, the line sensor is arranged inside a contact type CIS module 400.

A sensor drive unit 120 drives the sensor 110 and processes a charge read-out signal which is output from the sensor 110 to generate image data.

An image processing unit 130 performs various image processings, such as dust detection processing and shading calibration processing, on image data from the sensor drive unit 120.

An image memory 140 stores image data to be subjected to image processing by the image processing unit 130. Image data may be output to an external device from the image processing unit 130 or the image memory 140 via an interface or the like as communication means, not shown, based on control by the control unit 101.

A lamp drive unit 150 drives light emission of the lamp 160 (lamps 402 and 403 in FIG. 3), and causes the lamp 160 to emit light in a predetermined region, upon instruction by the control unit 101.

The lamp 160 irradiates an original document or the opposing plate 500 along the main scanning direction (the direction perpendicular to the sheet plane of FIGS. 2 and 3), and the lamp drive unit 150 performs light emission driving, namely light emission/non-light emission.

An opposing plate drive unit 170 is a drive unit that disposes the opposing plate 500 so as to dispose one of the original document guide member, white reference member and achromatic constant-density reference member at the position opposite to the CIS module 400, as described later.

In the present embodiment, "shading initialization data" is generated from shading data obtained by reading the white reference member 510 at the time of factory shipment of the image reading apparatus 100 or installation by a user. Further, in the present embodiment, "shading data" is generated from shading data obtained by reading the white reference member 510 at the time of using the image reading apparatus 100. "Shading calibration data" is generated from the shading data and black calibration data.

(Operation in First Embodiment)

Operation of the image reading apparatus in the first embodiment will be described, referring to the flowcharts and other illustrations starting with FIG. 4.

(1) Overall Processing

First, overall processing in the present embodiment will be described, referring to FIG. 4. The control unit 101 executes the processing shown by the flowchart in FIG. 4, at the time of power on of the image reading apparatus 100 or every time when a predetermined time elapses, in a stage prior to reading operation of an original document.

That is, first, white dust detection processing (step S401 in FIG. 4) is executed in a state that the opposing plate 500 is driven to the position (refer to FIG. 6*a*) where the image of the achromatic constant-density reference member 520 is picked up. Then, the chromatic dust detection processing (step S402 in FIG. 4) is executed in the state that the opposing plate 500 is driven to the position (refer to FIG. 6*b*) where the image of the white reference member 510 is picked up. Thereafter, shading calibration processing (step S403 in FIG. 4) is executed, and the opposing plate 500 is driven to the position of the original document guide member 530 (refer to FIG. 6*c*) to prepare to read an original document (step S404 in FIG. 4).

(2-1) White Dust Detection Processing:

Herein, a subroutine for the white dust detection processing in the flowchart in FIG. 4 will be described, referring also to the detailed flowchart of the subroutine in FIG. 5.

Figure 5:
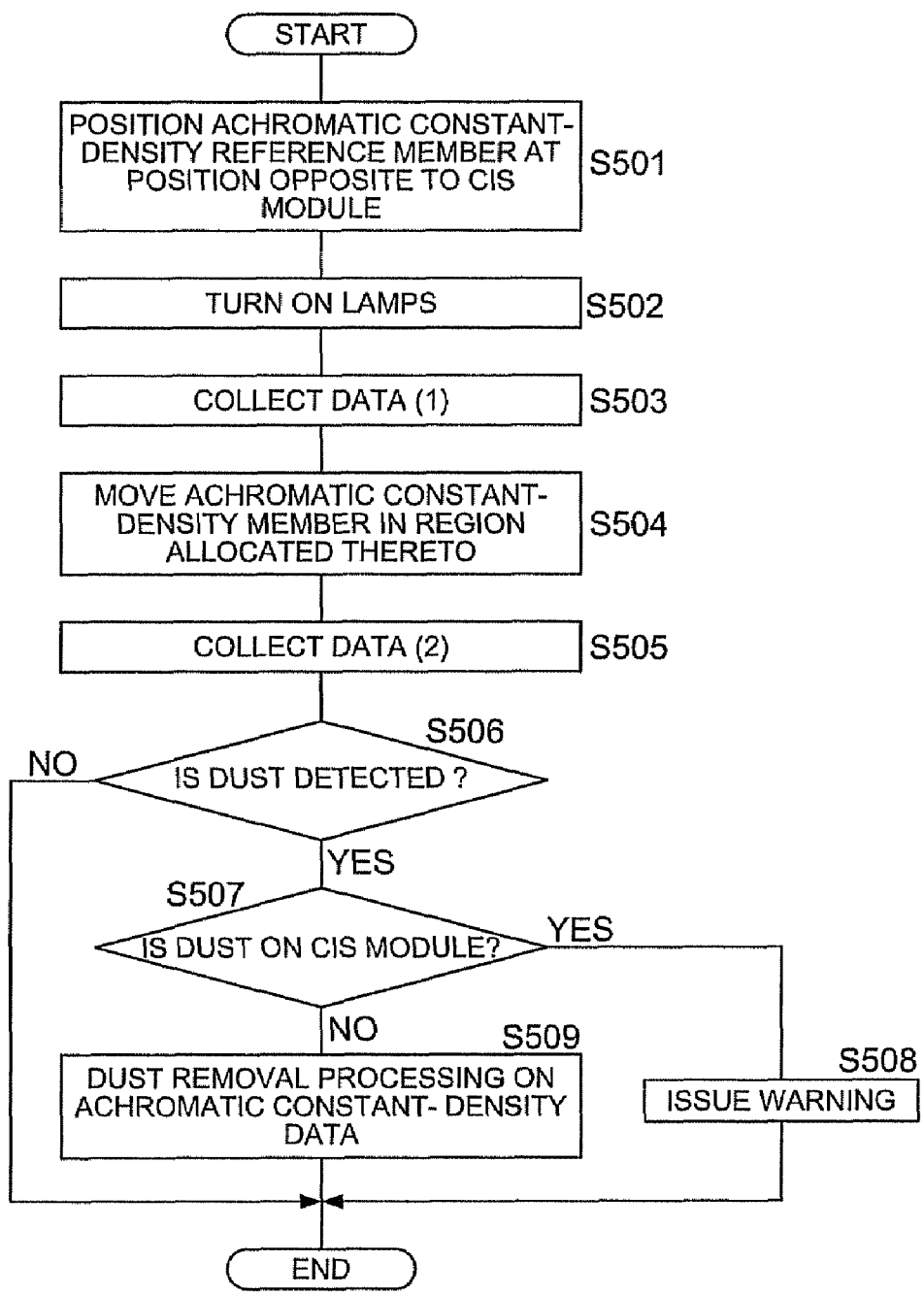
FIG. 5 is another flowchart showing processing operation in the above embodiment of the invention.
Figure 6:
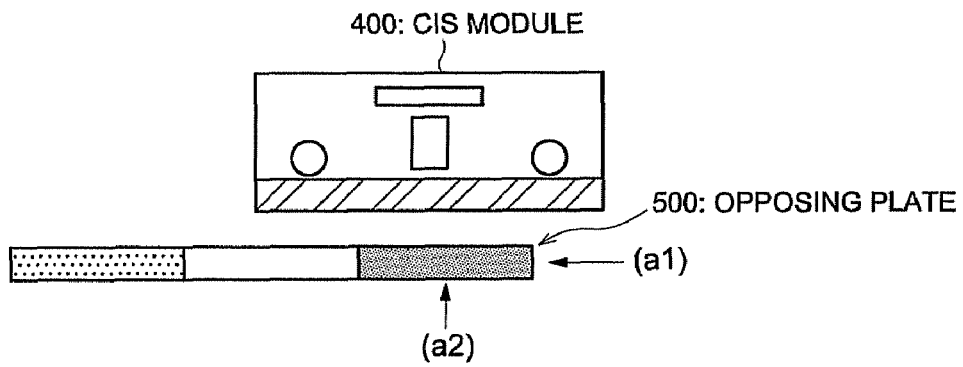
FIGS. 6a to 6c are structure diagrams showing operation states of the image reading apparatus in the above embodiment of the invention.
Figure 6:
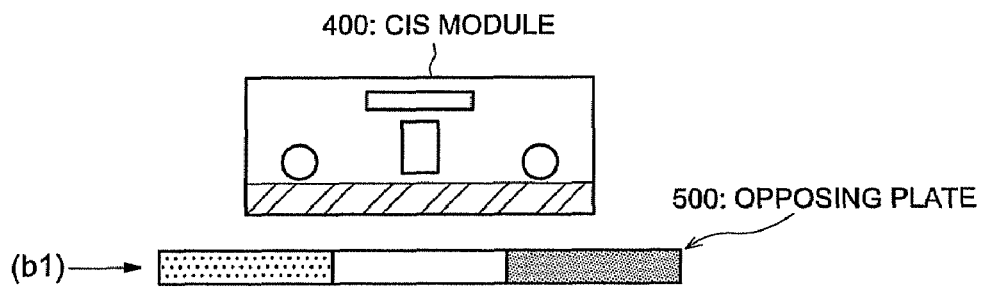
Figure 6:
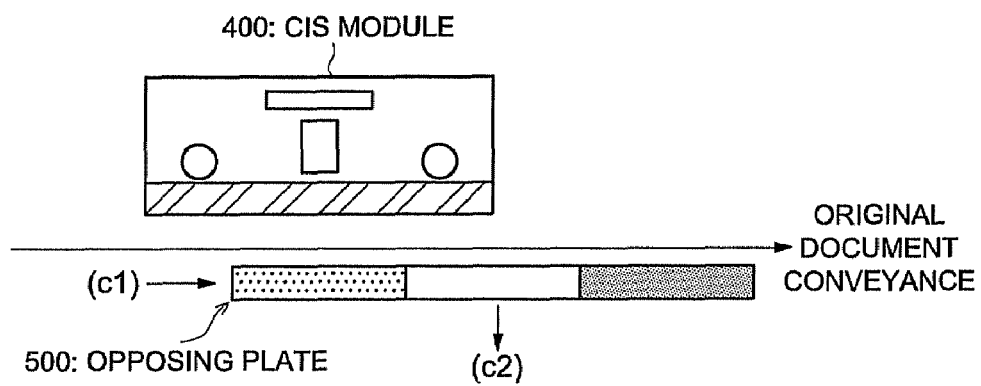

Upon instruction by the control unit 101, the opposing plate drive unit 170 positions the achromatic constant-density reference member 520 at the opposite position (position for image pickup) to the CIS module 400 (step S501 in FIG. 5 and a1 in FIG. 6*a*).

Herein, the surface, of which image is to be picked up, of the achromatic constant-density reference member 520 is disposed to be on the same plane as the moving plane of an original document (a2 in FIG. 6*a*), thereby enabling accurate control of focusing by the CIS module 400 and reliable detection even of fine dust.

Further, upon instruction by the control unit 101, the lamp drive unit 150 turns on the lamps 402 and 403 in the CIS module 400 (step S502 in FIG. 5), and performs dust detection from image data obtained by picking up the image of the surface of the achromatic constant-density of the achromatic constant-density reference member 520 with the CIS module 400 (step S503 in FIG. 5).

As shown in FIG. 8*b*, when the achromatic constant-density reference member 520 is gray colored, the value of image data varies extremely at positions where white dust in a color brighter than the gray color is present and varies extremely at positions where chromatic dust in a color darker than the gray color is present. Accordingly, the presence of such dust is detracted.

Though not shown, when the achromatic constant-density reference member 520 is black colored, the value of image data varies extremely at positions where white dust in a color brighter than the black color is present and varies extremely at positions where chromatic dust in a color brighter than the black color is present. Accordingly, the presence of such dust is detected.

In such a manner, using the achromatic constant-density reference member 520, white dust, such as paper dust, which could not be distinguished from a white color of the white reference member 510 can be reliably detected without a cumbersome control, such as changing the illumination intensity by a lamp.

Herein, upon instruction by the control unit 101, the opposing plate drive unit 170 moves the achromatic constant-density reference member 520 so that an image of the achromatic constant-density reference member 520 can be picked up at a different position in the region allocated to the achromatic constant-density reference member 520 (step S504 in FIG. 5).

Still further, upon instruction by the control unit 101, dust detection is performed from image data obtained by picking up an image of the surface of the achromatic constant-density of the achromatic constant-density reference member 520 with the CIS module 400 (step S505 in FIG. 5).

Herein, since two pieces of data, as shown in FIG. 8*b*, can be obtained, the control unit 101 instructs the image processing unit 130 to compare the two pieces of data (step S506 in FIG. 5). If dust is detected in neither piece of data (No in step S506 in FIG. 5), then processing is terminated. If the positions of dust in the two pieces of data accord with each other (Yes in step S507 in FIG. 5), then since it is because the detected dust is adhered to the glass surface 401 or the like of the CIS module 400, the control unit 101 displays a warning on the display unit 105 (step S508 in FIG. 5), and terminates the processing. The warning in this case means a message or the like notifying that cleaning is necessary because dust is adhered to the glass surface 401 or the like of the CIS module 400.

If the dust positions of the two pieces of data do not accord with each other (No in step S507 in FIG. 5), the detected dust is present not on the glass surface 401 of the CIS module 400, but on the achromatic constant-density reference member 520. In this case, data of portions where no dust is present is synthesized from the obtained two pieces of data, thereby generating data as achromatic constant-density reference member reading data (step S509 in FIG. 5), and the processing is terminated.

The achromatic constant-density reference member reading data obtained by the comparison in the image processing unit 130 is stored in the shading data memory 109, as necessary, and used as shading data.

Incidentally, regarding the achromatic constant-density reference member 520, the achromatic constant density may be in a gray color or in a black color, which can be arbitrarily determined. It is possible to easily detect white dusty by making the achromatic constant-density to be black, while not only white dust but also high-density chromatic dust can be easily detected by making the achromatic constant-density to be in a color between a white color and black color.

(2-2) Achromatic Dust Detection Processing

Herein, a chromatic dust detection subroutine of the flowchart in FIG. 4 will be described, referring to the detailed flowchart of the subroutine in FIG. 7.

Figure 7:
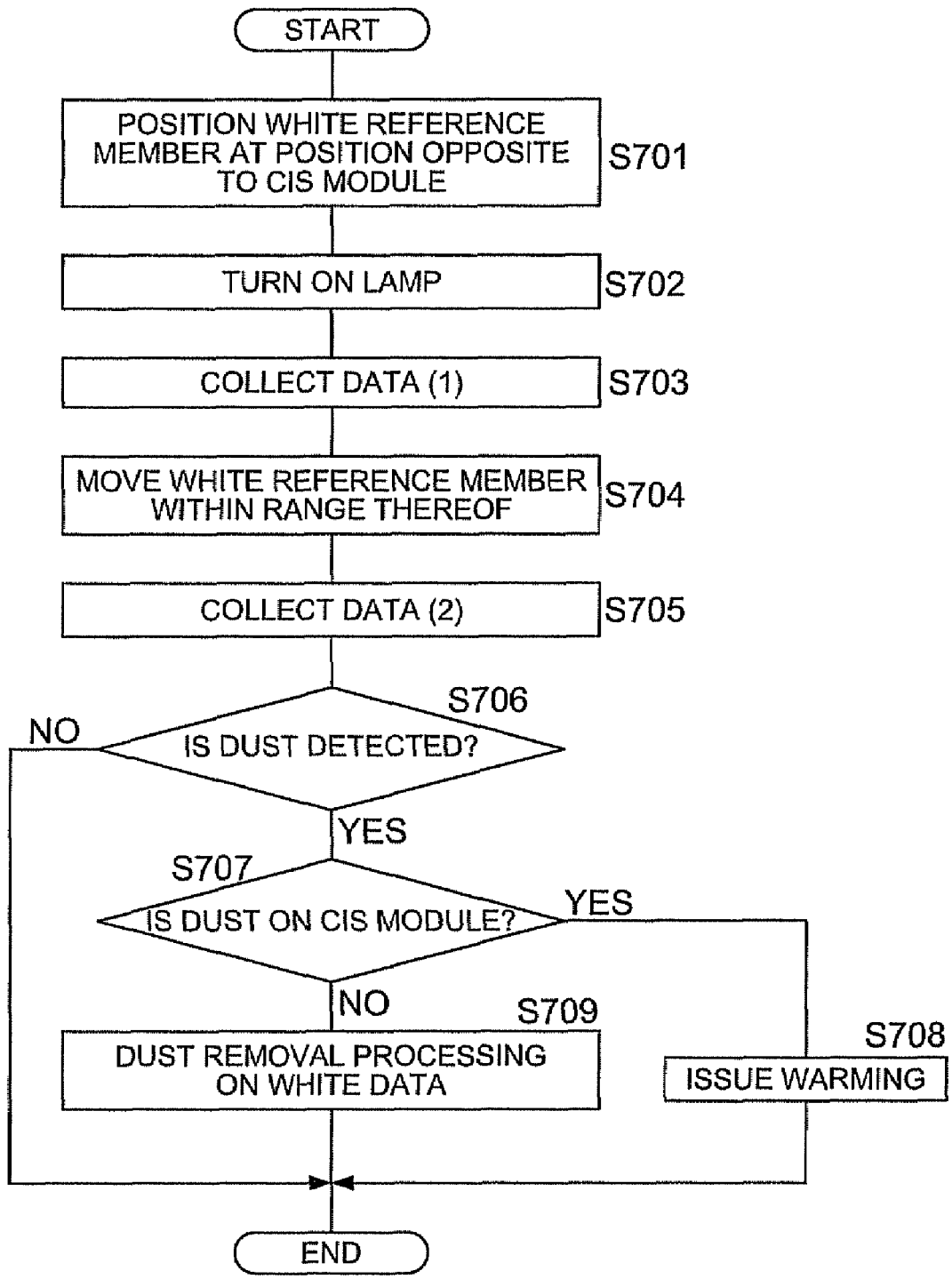
FIG. 7 is a flowchart showing processing operation in the above embodiment of the invention.

Upon instruction by the control unit 101, the opposing plate drive unit 170 positions the white reference member 510 at the opposite position (position for image pickup) to the CIS module 400 (step S701 in FIG. 7, b1 in FIG. 6b).

Herein, the surface, of which image is to be picked up, of the white reference member 510 is disposed to be on the same plane as the moving plane of an original document, the same as in the case of the achromatic constant-density reference member 520, thereby enabling accurate control of focusing by the CIS module 400 and reliable detection even of fine dust.

Further, upon instruction by the control unit 101, the lamp drive unit 150 turns on the lamps 402 and 403 in the CIS module 400 (step S702 in FIG. 7), and performs dust detection from image data obtained by picking up the image of the white colored surface of the white reference member 510 with the CIS module 400.

As shown in FIG. 8a, since the white reference member 820 is white colored, white dust such as paper dust is not detected, while presence of dust is detected at a position where achromatic dust having a higher density than that of the white color is present, due to an extreme difference in the value of the image data (step S703 in FIG. 7).

Herein, upon instruction by the control unit 101, the opposing plate drive unit 170 moves the white reference member 510 so that an image of the white reference member 510 can be picked up at a different position in the region taken by the white reference member 510 (step S704 in FIG. 7).

Further, upon instruction by the control unit 101, dust detection is performed from the image data obtained by picking up the image of the white colored surface of the white reference member 510 with the CIS module 400 (step S705 in FIG. 7).

Herein, since two pieces of data, as shown in FIG. 8a, can be obtained, the control unit 101 instructs the image processing unit 130 to compare the two pieces of data (step S706 in FIG. 7). If dust is not detected in the either piece of data (No in step S706 in FIG. 7), then processing is terminated. If the positions of dust in the two pieces of data accord with each other (Yes in step S707 in FIG. 7), since the detected dust is adhered to the glass surface 401 or the like of the CIS module 400, the control unit 101 displays a warning on the display unit 105 (step S708 in FIG. 7), and terminated the processing. The warning in this case means a message or the like notifying that cleaning is necessary because dust is adhered to the glass surface 401 or the like of the CIS module 400.

If the dust positions of the two pieces of data do not accord with each other (No in step S707 in FIG. 7), the detected dust is present not on the glass surface 401 of the CIS module 400, but on the white reference member 510. In this case, data of portions where no dust is present is synthesized from the obtained two pieces of data, thereby generating data as white reference member reading data (step S709 in FIG. 7), and the processing is terminated.

The white reference member reading data obtained by the comparison in the image processing unit 130 is stored in the shading data memory 109, and used as shading data.

(2-3) Shading Calibration Processing

With the white reference member reading data obtained through the above processing, shading calibration data is generated to remove effects by a drop in light intensity of the lamps at the ends, or the like, and is stored in the shading data memory 109.

Further, with both the white reference member reading data and the achromatic constant-density reference member reading data obtained through the above processing, shading calibration data may be generated to remove effects by a drop in light intensity of the lamps at the ends, or the like.

(2-4) Reading Preparation

Figure 4:
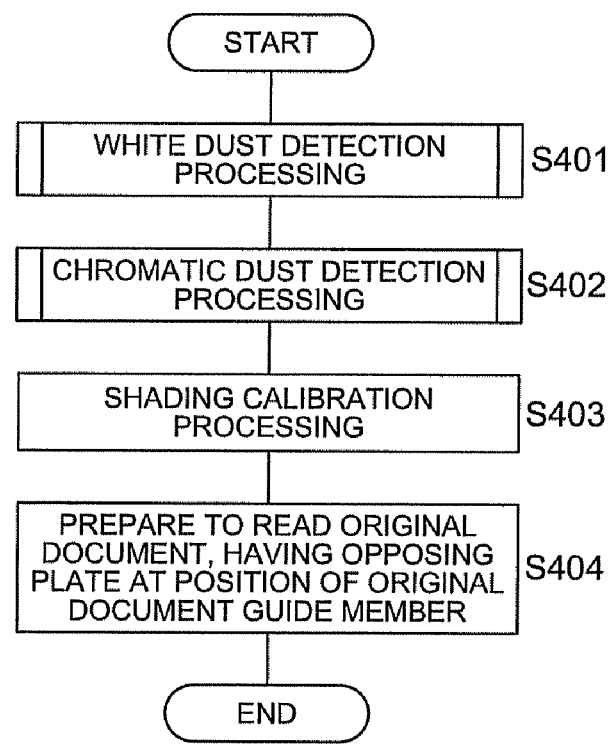
FIG. 4 is a flowchart showing processing operation in the above embodiment of the invention.

Herein, the control unit 101 drives the opposing plate 500 to the position of the original document guide member 530 (c1 in FIG. 6c), to prepare for reading of an original document (step S404 in FIG. 4).

As described above, for reading the achromatic constant-density reference member 520 and white reference member 510, the surface, of which image was picked up, of the opposing plate 500 was disposed such as to be on the same plane as the moving plane of an original document (a2 in FIG. 6a). Accordingly, now upon instruction by the control unit 101, the opposing plate drive unit 170 disposes the original document guide member 530 so that the surface, of which image is to be picked up, of an original document is positioned at the image pickup position (c2 in FIG. 6c).

(3) Effects Obtained from the Present Embodiment (3-1) In the present embodiment, to read an image of an original document by irradiating the original document with light and photoelectrically converting the reflected light from the original document with the CIS module 400 of a contact type, the following procedure is taken. That is, first, prepared are the original document guide member 530 which is positionable at the opposite position to the COS module 400 with the conveying position of an original document therebetween and is used when conveying an original document, the white reference member 510 which is positionable at the opposite position to the COS module 400 with the conveying position of an original document therebetween and has a white color to be a reference on the surface, and the achromatic constant-density reference member 520 which is positionable at the opposite position to the COS module 400 with the conveying position of an original document therebetween and has an achromatic constant-density to be a reference on the surface. Next, the opposing plate drive unit 170 drives the white reference member 510 to the position opposite to the CIS module 400, and dust detection processing is executed. Then, the opposing plate drive unit 170 drives the achromatic constant-density reference member 520 to the position opposite to the CIS module 400, and dust detection processing is executed. In the dust detection processings, the control unit 101 performs control to detect the positions of dust from processing results by the image processing unit 130.

As a result, dust (chromatic dust) having a density is detected with the white reference member 510, and dust (white dust) having no density is detected with the achromatic constant-density reference member 520. That is, in an image reading apparatus that reads an image of an original document by irradiating the original document with light and photoelectrically converting the reflected light from the original document with the CIS module 400 of a contact type, it is possible to easily detect not only chromatic dust but also white dust without changing light intensity of light to be irradiated onto the original document.

(3-2) In the present embodiment, white dust and chromatic dust which are apt to adhere to the CIS module 400 can be easily detected, when reading an image of an original document by irradiating the original document with light and photoelectrically converting the reflected light from the original document with the CIS module 400 of a contact type in a state where the CIS module 400 is fixed and the original document is conveyed.

(3-3) In the present embodiment, since the white reference member 510, the achromatic constant-density reference member 520, and the original document guide member 530 are structured in an integrated form, the white reference member 510 is driven to the position opposite to the CIS module 400 and chromatic dust detection processing is performed, then the achromatic constant-density reference member 520 is driven to the position opposite to the CIS module 400 and white dust detection processing is performed, and thereafter the original document guide member 530 is driven to the position opposite to the CIS module 400 and common reading is performed. As a result, white dust detection, chromatic dust detection, and common reading are smoothly performed.

(3-4) In the present embodiment, the achromatic constant-density reference member 520 and the original document guide member 530 are disposed to the respective outer sides of the white reference member 510, with the white reference member 510 therebetween, which achieves smooth performance of white dust detection, chromatic dust detection, and common image reading.

(3-5) In the present embodiment, control is performed to execute white dust detection processing by the use of the achromatic constant-density reference member 520, and thereafter execute chromatic dust detection processing by the use of the white reference member 510, which achieves smooth performance of white dust detection, chromatic dust detection, and common image reading.

(3-6) In the present embodiment, it is determined whether detected dust is on the side of the CIS module 400, or either on the white reference member 510 or on the achromatic constant-density reference member 520. If it is determined that the detected dust is on the side of the CIS module 400, then a warning is issued notifying that dust is adhered to the CIS module 400, and thus image reading with the CIS module 400 in an improper state can be prevented.

(3-7) In the present embodiment, having the achromatic constant-density of the achromatic constant-density reference member 520 be a black color, white dust can be easily detected.

(3-8) In the present embodiment, having the achromatic constant-density of the achromatic constant-density reference member 520 be an achromatic constant-density between a white color and black color, it is possible to easily detect not only white duct but also chromatic dust with a high density.

(3-9) In the present embodiment, when the images of the white reference member 510 and the achromatic constant-density reference member 520 are picked up by the CIS module 400 for dust detection processing, the surfaces, of which images are to be picked up, of the white reference member 510 and the achromatic constant-density reference member 520 are disposed to be on the same plane as the running plane of an original document. Thus, focusing by the CIS module 400 can be accurately controlled, thereby achieving reliable detection of even fine dust.

(3-10) In the present embodiment, shading calibration data is generated according to a result of picking up an image of the white reference member 510, and further, a shading calibration unit is arranged that executes shading calibration along the main scanning direction based on the shading calibration data. In such a manner, shading calibration is executed, based on correct shading calibration data after detection of white dust and chromatic dust through the above items (1) to (9), and thus accurate reading can be performed.

(3-11) In the present embodiment, when dust is detected on the white reference member 510 by dust detection processing, shading calibration data without being effected by dust is generated, according to a result of picking up an image of the white reference member 510 plural times. Thus, shading calibration is performed with correct shading calibration data obtained after removing the effects by dust, which achieves accurate reading.

(4) Modified Examples

In the above embodiment, the opposing plate 500 is a flat plate, and the opposing plate drive unit 170 moves the opposing plate 500 in parallel to the original document conveying direction, so as to switch the positions of the white reference member 510, the achromatic constant-density reference member 520, and the original document guide member 530.

In addition to this, as a cross-section is shown in FIG. 9, it is possible to form the opposing plate 500 to be a polygonal prism having a polygonal cross-section. In this case, the direction perpendicular to the sheet of FIG. 9 is the longitudinal direction of the opposing plate 500 and also the main scanning direction. Herein, the opposing plate drive unit 170 rotationally drives the opposing plate 500 in this polygonal prism form, according to instruction by the control unit 101.

In this case, the three surfaces of the white reference member, achromatic constant-density reference member, and original document guide member satisfy the minimum requirement in terms of structure, however, a triangular prism may contact with the CIS module 400 when rotating. Therefore, six surfaces including pairs of the same type of surfaces is preferable. Nine surfaces or twelve surfaces, being multiples of three, may be applied, however the size will be large. Accordingly, the structure may be formed fitted to the size of the image reading apparatus. Further, in this case, in the steps of picking images of a same member at different positions in the present embodiment, it is possible to read different surfaces of the same color.

Further, in the above examples, it has been described such that the CIS module 400 is in a single color. A monochrome or colored CIS module 400 can be applied to the present embodiment. In the case of colored one, the above described processings may be respectively executed for the respective colors, or may be executed at the same time for the respective colors.

In the case of a color image reading apparatus, by having the achromatic constant-density reference member 520 be in a gray color and generating shading calibration data by the use also of the achromatic constant-density reference member reading data, color balance can be maintained suitably.

Further, in the above examples, although the fixed CIS module 400 reads an image while an original document is conveyed, the invention is not limited thereto. That is, the CIS module 400 and the opposing plate 500 may be moved relatively to an original document, while the original document is fixed.

Still further, in FIG. 2, although the image reading apparatus reads the both sides of an original document, an image reading apparatus reads only a single side of an original document with a single CIS module 400, and an image reading apparatus which is provided with two CIS modules 400 and reads both sides of an original document are also applicable.

What is claimed is:

1. An image reading apparatus for reading an image on an original document by irradiating the original document with light and photoelectrically converting reflected light from the original document by a contact type image pickup unit, comprising:

an original document guide member that is positionable at a position opposite to the image pickup unit, with a conveyance position of the original document therebetween, and is used when the original document is conveyed;

a white reference member that is positionable at the position opposite to the image pickup unit, with the conveyance position of the original document therebetween, the white reference member having a reference white color on a surface;

an achromatic constant-density reference member that is positionable at the position opposite to the image pickup unit, with the conveyance position of the original document therebetween, the achromatic constant-density reference member having a reference achromatic constant-density on a surface;

a drive unit that moves one of the original document guide member, the white reference member, and the achromatic constant-density reference member so as to be positioned at the position opposite to the image pickup unit; and a control unit that controls execution of a first detection processing for dust detection from data obtained by moving the achromatic constant-density reference member to the position opposite to the image pickup unit by the drive unit and by reading the achromatic constant-density reference member, and execution of a second detection processing for dust detection from data obtained by moving the white reference member to the position opposite to the image pickup unit by the drive unit and by reading the white reference member.

2. The image reading apparatus of claim 1, wherein the readings are carried out, having the image pickup unit fixed and having the original document conveyed.

3. The image reading apparatus of claim 1, wherein the white reference member, the achromatic constant-density reference member, and the original document guide member are integrally constructed.

4. The image reading apparatus of claim 3, wherein the achromatic constant-density reference member and the original document guide member are disposed with the white reference member therebetween.

5. The image reading apparatus of claim 1, wherein the control unit executes the first dust processing first and the second dust processing thereafter.

6. The image reading apparatus of claim 1, wherein the control unit determines whether a detected dust is on the image pickup unit, or on either the white reference member or the achromatic constant-density reference member, and when the control unit has determined that the detected dust is on the image pickup unit, the control unit warns that dust is stuck to the image pickup unit.

7. The image reading apparatus of claim 1, wherein the achromatic color constant-density is black colored.

8. The image reading apparatus of claim 1, wherein the achromatic color constant-density is colored between white and black.

9. The image reading apparatus of claim 1, wherein, when the image pickup unit picks up an image of the white reference member or the achromatic constant-density reference member for detection processing, the drive unit positions the white reference member or the achromatic constant-density reference member such that the surface thereof for image picking-up is on the same plane as a conveyance plane of the original document.

10. The image reading apparatus of claim 1, further comprising a shading calibration unit that generates shading calibration data, based on a result of picking-up an image of the white reference member, and executes shading calibration along a scanning direction, based on the shading calibration data.

11. The image reading apparatus of claim 10, wherein when a dust is detected on the white reference member by the second dust detection processing, the control unit moves the white reference member to pickup plural images thereof, and the shading calibration unit generates shading calibration data free from being affected by the dust, based on a result of picking-up of the plural images of the white reference member.

12. A Method for controlling an image reading apparatus, wherein the image reading apparatus includes:

an original document guide member that is positionable at a position opposite to an image pickup unit, with a conveyance position of an original document therebetween, and is used when the original document is conveyed;

a white reference member that is positionable at the position opposite to the image pickup unit, with the conveyance position of the original document therebetween, the white reference member having a reference white color on a surface; and an achromatic constant-density reference member that is positionable at the position opposite to the image pickup unit, with the conveyance position of the original document therebetween, the achromatic constant-density reference member having a reference achromatic constant-density on a surface;

the method comprising the steps of:

moving the achromatic constant-density reference member to the position opposite to the image pickup unit and executing a first detection processing for dust detection from data obtained by reading the achromatic constant-density reference member; and moving the white reference member to the position opposite to the image pickup unit and executing a second detection processing for dust detection from data obtained by reading the white reference member.

* * * * *